(12) United States Patent
Heiser et al.

(10) Patent No.: US 10,504,139 B1
(45) Date of Patent: Dec. 10, 2019

(54) CAMPAIGNS RESPONSIVE TO KEYWORD TRENDS

(71) Applicant: Quantcast Corporation, San Francisco, CA (US)

(72) Inventors: Julie L. Heiser, San Francisco, CA (US); Vera M. K. Dadok, Berkeley, CA (US)

(73) Assignee: Quantcast Corporation, San Francisco, CA (US)

( * ) Notice: Subject to any disclaimer, the term of this patent is extended or adjusted under 35 U.S.C. 154(b) by 118 days.

(21) Appl. No.: 15/474,958

(22) Filed: Mar. 30, 2017

(51) Int. Cl.
*G06Q 30/00* (2012.01)
*G06Q 30/02* (2012.01)

(52) U.S. Cl.
CPC ..... *G06Q 30/0244* (2013.01); *G06Q 30/0241* (2013.01); *G06Q 30/0256* (2013.01); *G06Q 30/0276* (2013.01)

(58) Field of Classification Search
CPC ................................................ G06Q 30/0241
USPC .......................................................... 705/14
See application file for complete search history.

(56) References Cited

U.S. PATENT DOCUMENTS

| | | | |
|---|---|---|---|
| 8,676,795 B1* | 3/2014 | Durgin | G06F 17/2715 707/730 |
| 2016/0253715 A1* | 9/2016 | Xie | G06Q 30/0251 705/14.72 |
| 2017/0076319 A1* | 3/2017 | Ballard | G06Q 30/0246 |

* cited by examiner

*Primary Examiner* — Matthew L Hamilton
(74) *Attorney, Agent, or Firm* — Robin W. Reasoner; Andrea Wheeler

(57) ABSTRACT

Online advertising campaigns are operated responsive to keyword trends. The keywords used by a group of browsers is analyzed periodically over time. A list of the most frequently used keywords is separated into those that have previously appeared on the list, referred to herein as the stable keywords, and those that are newly emerging, referred to herein as the trending keywords. The advertiser selects at least one advertising creative that the advertiser associates with the stable keywords, referred to herein as the stable creative, and at least one advertising creative that the advertiser associates with the trending keywords, referred to herein as the trendy creative. The advertising system then operates the online advertising campaign to deliver the respective stable and trendy creatives in proportion to the frequency of use of the trending versus the stable keywords.

23 Claims, 6 Drawing Sheets

Stable | Trending

Weather
Giants   49ers
Bay Area   Restaurants
San Francisco
Golden Gate  Traffic Marathon   Traveling Exhibit
San Francisco
City Hall Protest

FIG. 5

CAMPAIGNS RESPONSIVE TO KEYWORD TRENDS

BACKGROUND

Technical Field

This invention pertains in general to digital advertising and in particular to selection of creatives.

Description of Related Art

Search marketing is the process of gaining traffic and visibility from search engines, for example, by paying for an advertisement to appear on a page of results after a particular keyword is entered into the search engine. Search marketing tends to perform well because a user who enters a keyword is actively expressing an interest in learning more about the topic of the keyword. Thus, ads relevant to the expressed interest can be served. Moreover, people who are in the market to make a purchase commonly perform searches related to the product or service they intend to buy. Thus, ads that are delivered as part of search results reach people at a time when they are likely to be receptive to the ads.

Despite these advantages, search marketing has several drawbacks. First, search marketing has limited scale. Ads are served only after a user submits a search query to the search engine. The numbers of people who actually conduct a search is a limited population. Second, search marketing is reactive rather than proactive. By design, search marketing reacts to what the user has entered into the search engine rather than anticipating the user's interests. Third, because search marketing is in high demand, it can be difficult and/or costly to serve ads in response to desired keywords.

Responsive to the limitations of search marketing, a technique was developed by Quantcast Corp. of San Francisco, Calif., to discover those who are more likely than the average person to be interested in an advertised product or service based on the behavioral similarity between the potential customer and those who have searched for one or more selected keywords. As described in U.S. application Ser. No. 14/816,996, incorporated herein by reference in its entirety, the popularity of keywords used in searches can be recorded for a group of browsers. When a user of a browser enters keywords into a web search interface and selects a link from the search results page, the user's web browser navigates to a publisher's webpage. When the publisher's webpage is tagged with a direct measurement tag, a notification is sent to a direct measurement system. The notification may include the search keyword used from the referring URL and an anonymous identifier that links the user's browser to a history of recorded consumption events, such as visits to other websites, consumed content, purchases, and any other events associated with the anonymous identifier.

SUMMARY

Embodiments of the invention include a method, a non-transitory computer-readable storage medium and a system for operating online advertising campaigns responsive to keyword trends. The keywords used by a group of browsers is analyzed periodically over time. A list of the most frequently used keywords for the most recent time period is identified. Then, the list of the most frequently used keywords is separated into those that have previously appeared on the list, referred to herein as the stable keywords, and those that are newly emerging, referred to herein as the trending keywords. Optionally, the stable and trending keywords are graphically displayed to an advertiser. The advertiser selects at least one advertising creative that the advertiser associates with the stable keywords, referred to herein as the stable creative, and the advertiser selects at least one advertising creative that the advertiser associates with the trending keywords, referred to herein as the trendy creative. The advertising system receives both the stable and the trendy creatives from the advertiser. The advertising system then operates the online advertising campaign to deliver the respective stable and trendy creatives in proportion to the frequency of use of the trending versus the stable keywords. This enables the advertiser to automatically respond to fluctuations in the interest levels of audiences in various topics.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 5 is another example user interface for displaying keyword trends, in accordance with an embodiment of the invention.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention provide an advertising system an automatic mechanism to respond to fluctuations in the interest levels of audiences in various topics. If a group of browsers representing potential customers tend to use a standard set of keywords over time, they are exhibiting a high degree of stability. If the group of browsers tend to change the set of keywords used over time, they are exhibiting a high degree of trendiness. The advertising system responds to these patterns by adjusting the relative frequency that different creatives are shown, thus improving the appeal of the campaign to various segments of the campaign's audience.

Embodiments of the invention are described below in the context of a real-time bidding advertising exchange for opportunities to display advertisements to users through their web browsers. It is noted that similar techniques as those described below can be used in targeting advertisements in the context of other kinds of auctions and exchanges systems, for use with browser-based advertisements or other types of networked media as well. Such techniques are particularly useful where rapid decisions regarding advertisement opportunities are desirable.

Figure 1:
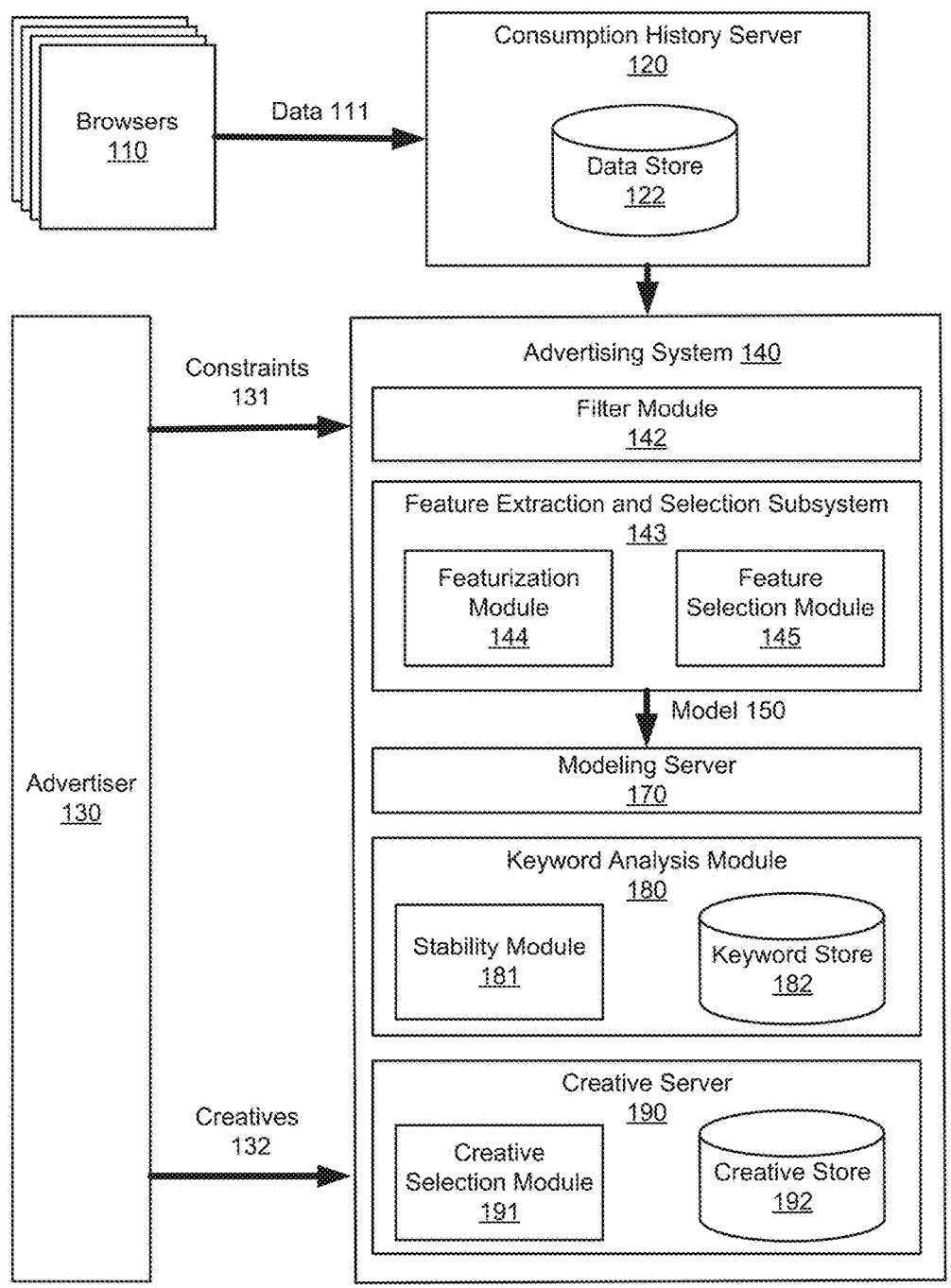
FIG. 1 is a high-level block diagram of a computing environment for operating online advertising campaigns responsive to keyword trends, in accordance with an embodiment of the invention.

FIG. 1 is a high-level block diagram of a computing environment for operating online advertising campaigns responsive to keyword trends, in accordance with an embodiment of the invention. The computing environment includes users' browsers 110, a consumption history server 120, at least one advertiser 130, and an advertising system 140.

The users' browsers 110 are web browsers executing on user devices, such as personal computers, laptop computers, tablet computers, and smartphones, as the users of those devices browse the web. As users undertake their normal web browsing activities using the browsers 110, in one embodiment, data 111 for some media consumption events is reported to the consumption history server 120. A media consumption event is the act of accessing content over a network, such as, but not limited to, accessing a web page from a web server. A variety of methods exist for associating an anonymous identifier with a web browser. For example, a hardware device identifier such as a Media Access Control Address (MAC address) which can be stored on a device operated by a user to access content over a network. As another example, a software identifier such as a cookie value can be locally stored. In other embodiments, identifiers can be composed and/or stored remotely from a device associated with the user. In some cases, a browser can have multiple identifiers, such as multiple first party cookies and multiple third party cookies, which can be used to identify the browser to various systems. A direct measurement system can collect and/or receive information for a browser or a system in conjunction with the identifier. In some cases, information collected and/or received by the direct measurement system can be processed before it is stored. For example, when a browser requests content from a content provider, the content provider can re-direct the browser to submit a pixel request to the direct measurement system. Based on the pixel request, and optional subsequent actions and/or interactions, the direct measurement system can collect and/or receive information from the browser in conjunction with an identifier in order to enable the maintenance of a coherent body of information, such as a consumption history, a portion of a consumption history, a consumption history score, a consumption history characterization and/or a consumption history digest, over time.

In the example illustrated in FIG. 1, the consumption history server 120 receives data 111 from the browsers 110. The received data 111 enables the consumption history server 120 to record media consumption events in a data store 122 in conjunction with an anonymous identifier, such as a cookie value. In FIG. 1, data store 122 is shown as internal to the consumption history server 120, but in other implementations, data store 122 may be external to or remote from the consumption history server 120. Also, only one instance of data store 122 is shown in FIG. 1 for clarity, but in practice, the consumption histories may be stored in a plurality of data stores, such as a distributed network of storage facilities.

The advertiser 130 is an advertiser for which a model for targeting advertisements is to be built. The campaign provides constraints 131 to the advertising system 140. The constraints 131 may be individually set to specify the operating parameters of the campaign, such as frequency caps for exposures, desired reach, budget, desired audience characteristics, and an indication of what counts as a success for the campaign such as the conversion criteria (e.g., visit to advertiser's website, product purchase, donation, registration, or another observable media consumption event). Thus, by analyzing consumption history data, converters can be distinguished from non-converters. In one variation, an advertiser 130 may also send a definition of non-converters (e.g., defining non-converters as visitors to a website that did not purchase a product, versus defining a non-converter as not having met the definition of conversion), and/or other attributes (such as geographic attributes, computer attributes, or any other type of attributes) to use to filter the data stream before building the model. For example, a campaign may indicate a geographic area to model for targeting advertisements, where only converters and non-converters from that area are used to build the model. Thus, a geo filter (not shown) can be applied to the data stream by the advertising system 140 at any point before the data stream is fed to the feature extraction and selection subsystem 143.

The advertising system 140 receives consumption histories from the consumption history server 120 and the constraints 131 from the advertiser 130 for use in building the model 150. Although as illustrated in FIG. 1, the data 111 is streamed first to the consumption history server, and the consumption histories are then provided to the advertising system 140, in another variation, the data 111 may also be streamed directly to the advertising system 140 which can perform the function of matching the streaming data 111 to the consumption histories that are needed to build the model. The advertising system 140 includes a filter module 142, feature extraction and selection subsystem 143, a modeling server 170, a keyword analysis module 180, and a creative server 190.

In one embodiment, the filter module 142 of the advertising system 140 uses the definition of a conversion received as part of the constraints 131 from the advertiser 130 to identify converters from the consumption history data. For example, if the definition of conversion is a visitation of a website, analyzing the consumption history data would reveal the status of a converter or non-converter. In other cases, the attribution system 140 may receive a signal from the conversion event directly, and thus no filtering need be applied to determine conversion status, but the advertising system 140 may still access the corresponding consumption history from the consumption history server 120 in this scenario.

The feature extraction and selection subsystem 143 optionally extracts and selects features from the consumption histories of the converters and non-converters that are the most strongly correlated to the status of a converter or non-converter. The feature extraction and selection subsystem 143 includes a featurization module 144 and a feature selection module 145. The featurization module 144 translates the consumption history into a set of many features. For example, the features of a consumption history may include websites visited, keyword searches entered, online purchases made, geographic location, topics from past ad opportunities, type of browser, etc. Then, the feature selection module 145 optionally determines which features are most strongly correlated with being a converter or a non-converter, and uses those features to form a model 150.

The model 150 is received by the modeling server 170. In one embodiment, the modeling server 170 applies the model 150 to a bid opportunity in order to decide whether to bid and how much to bid. By using the model to compare the features present in a browser's media consumption history as compared to the features present in the histories of the browsers that make up an advertiser's converter pool, the advertising system 140 can predict the likelihood that a browser will convert. The advertiser's constraints 131 may specify how much more an advertiser 130 is willing to pay for the opportunity to show an advertising exposure to a browser that is likely to convert versus one that is not likely to convert. The modeling server 170 may generate the bid price for the advertising system 140 to communicate to an advertising exchange.

The advertising system 140 also includes a keyword analysis module 180 for analyzing the keywords present in the media consumption histories of a group of browsers, for example by tracking the frequency of use of various keywords in different time periods. The keyword analysis module 180 periodically analyzes the keywords used by a group of browsers and identifies the list of the most frequently used keywords for a given time period and the respective frequency of use among the group of browsers. The keyword analysis module 180 may create a word cloud that represents the prevalence of the co-occurrence of two different keywords in the histories of a group of browsers. Examples of available software packages for word cloud generation include Tagul available from Tagul.com, jqcloud2 available from http://mistic100.github.io/jQCloud, or any other similar word cloud generation tool known to those of skill in the art. Example word clouds illustrating keywords from the histories of the group of browsers will be described below with reference to FIGS. 4-5. The group of browsers may be those browsers that have visited a particular webpage, browsers that searched for a particular keyword, such as a brand name, a competitor's brand name, a product, or a location, or the group of browsers may be a set of converters, for example, the advertiser's 130 set of converters. The keyword analysis module 180 also includes a stability module 181 and a keyword store 182.

The stability module 181 of the keyword analysis module 180 tracks which keywords that are present in the media consumption histories of a group of browsers are new additions to the list and which keywords have previously been on the list. This enables the stability module 181 to separate the list of identified keywords that frequently occur in the histories of a group of browsers into stable keywords and trending keywords. Stable keywords are keywords that have appeared on multiple lists taken from previous time periods. For example, stable keywords are identified in one embodiment as those words that have appeared among the highest frequency words identified by the keyword analysis module 180 in the last three time periods. Therefore, it is expected that these keywords will continue to be among the highest frequency words in the next period or several periods as well. Trending keywords are keywords that have newly appeared on the list of the highest frequency words identified by the keyword analysis module 180. For example, trending keywords are identified in one embodiment as those words that are newly emerging in popularity among the histories of the group of browsers that are analyzed. Although such trending keywords may continue to be among the highest frequency words in the next period, it is expected that the popularity among the histories of the group of browsers that are analyzed will decrease again. In some cases, a trending keyword that continues to be popular across several consecutive time periods then qualifies as a stable keyword. In other cases, stable keywords can decrease in popularity over time which lead them falling off the list of the highest frequency words. Usually the rise and fall of stable keywords occurs over a much longer time horizon than the rise and fall of trending keywords. In one embodiment, the stability module 181 notifies the advertiser 130 of any significant change in the composition of the most frequently occurring keywords in the histories of a group of browsers. For example, if a new trending keyword becomes one of the top five most frequently used or if a keyword increases in use more than a threshold proportion, for example 10% between one period and the next, the stability module 181 will alert the advertiser 130 of this emerging trend. Alternatively or additionally, keyword analysis module 180 may visually distinguish the keywords that are rapidly increasing in popularity in the word clouds presented to the user, for example by underlining the word, such as illustrated in the example of FIG. 5, in order to draw the advertiser's attention to the new trend. Advertisers may choose to capitalize on new trends by generating special creatives to put into rotation in their campaigns that refer to the trending word, event, or concept.

The keyword store 182 stores the identified trending and stable keywords among each group of browsers and a metric that expresses the frequency that the respective keyword appears among the histories of the group of browsers that are analyzed. In some instances, all keywords that appear among the histories of the group of browsers are stored, and in other instances only the top N words and their frequencies are stored, for example where N equals 20 or 100, or any other computationally reasonable number. The keyword store 182 is used to power the word clouds that may be presented as visual feedback to an advertiser, for example, in a format illustrated in FIG. 4 or 5.

Referring back to FIG. 1, the advertising system 140 also includes a creative server 190. The creative server 190 receives creatives 132 from the advertiser 130. In one embodiment, the received creatives 132 include at least one creative designated as stable and at least one creative designated as trendy. The creative server 190 includes a creative selection module 191 and a creative store 192. The creative selection module 191 selects between the received creatives 132 in order to serve them in proportion to the frequency of stable versus trending keywords among the group of browsers as reported by the keyword analysis module 180. The creative store 192 stores the creatives 132 or pointers to the locations of those creatives for access by the creative server 190 in communicating with advertising exchanges.

For clarity, FIG. 1 has illustrated only one instance of an advertiser 130, and only one instance of an advertising system 140. In practice, many campaigns may be simultaneously active from any number of advertisers 130, and models may be built for each of them. Moreover, for any one campaign, to take advantage of parallel processing, and for speed in developing and updating models, a stream of data may be split and diverted to multiple advertising systems 140, each building a model from the data that have been routed to it. For example, the model can optionally be separately built and updated on multiple servers, for example each located in relative proximity to an advertising exchange, in order to support bidding on advertising opportunities in a real-time bidding environment. Even in instances where the models are built separately, periodically, the models may be synchronized, reconciled, or combined, for example every few hours or at the end of the day, or on another schedule, to prevent them from diverging too greatly, and to ensure that all models are benefiting from recent improvements to the models. In other embodiments, the models are not combined, in order to preserve the existence of differing regional trends experienced by subsets of the geographically dispersed servers.

Figure 2:
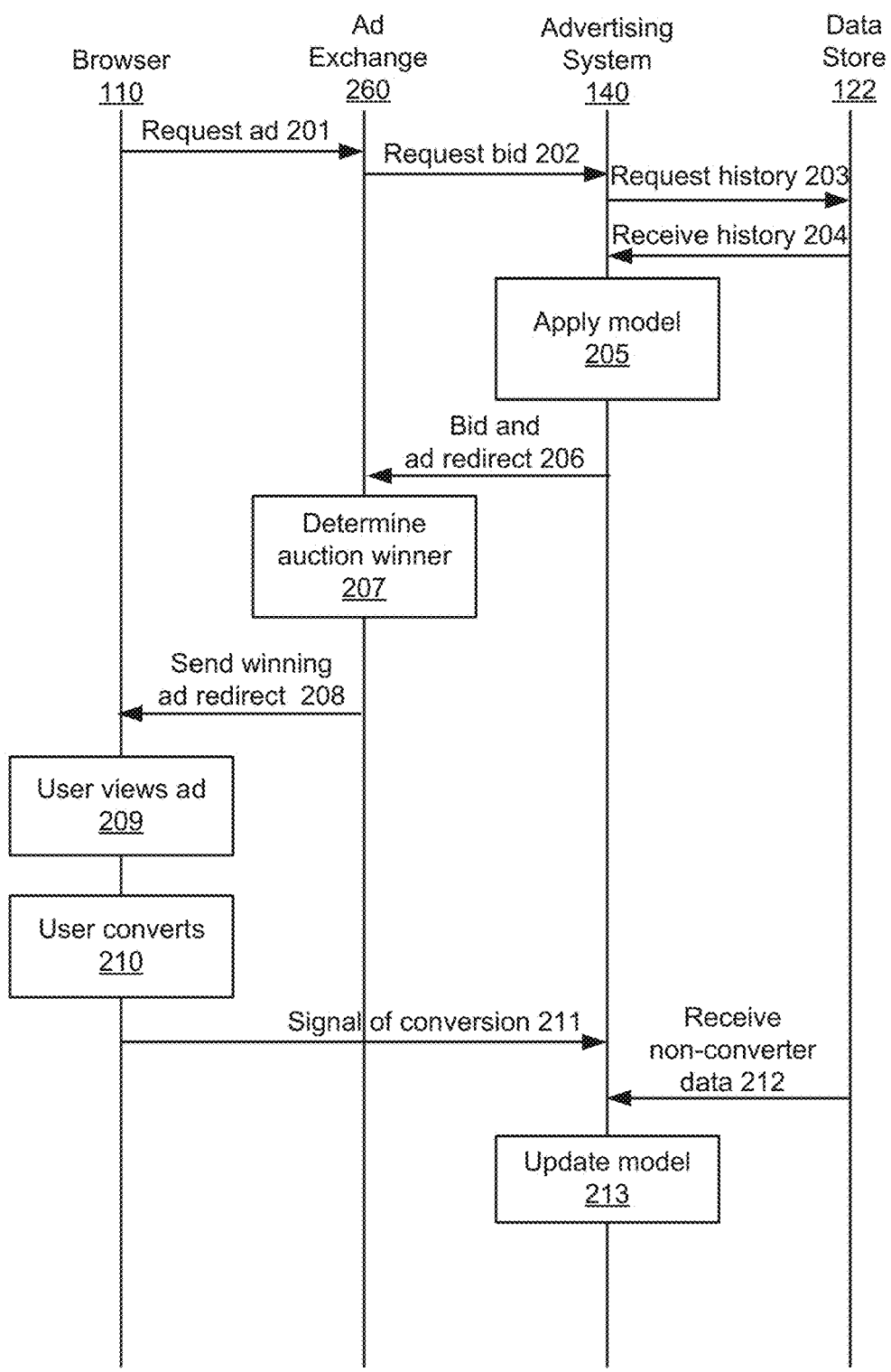
FIG. 2 is an interaction diagram illustrating operation of an online advertising campaign responsive to keyword trends in a real-time bidding programmatic advertising environment, in accordance with an embodiment of the invention.

FIG. 2 is an interaction diagram illustrating operation of an online advertising campaign responsive to keyword trends in a real-time bidding programmatic advertising environment, in accordance with an embodiment of the invention. It is noted that FIG. 2 is merely illustrating an example of a real-time bidding environment, and the interactions depicted in FIG. 2 may vary in other examples.

In the scenario illustrated in FIG. 2, as a user operates browser 110 and navigates to a publisher's website that includes ad slot to be auctioned in an ad exchange 260, the publisher's web server sends instructions to the browser 110 for accessing content to be displayed on the website, including a coded link known as an "ad tag" that points to an advertising exchange 260. The browser 110 uses the ad tag to contact the advertising exchange 260 with a request for an ad in step 201.

The ad exchange 260 receives the request for the ad from the browser 110 and reads the identifier. In response, the ad exchange starts the auction in step 202 by sending a bid request to the advertising system 140 and to other servers to notify potential bidders of the bidding opportunity. Included with the bid request is the identifier and other data describing the bid opportunity, such as, for example, the URL on which the ad will be delivered, the topic of the webpage on which the ad will appear, site visit frequency, and/or the dimensions of the ad slot.

The advertising system 140 receives the request for the bid 202, and may match the identifier delivered from the ad exchange 260 to the modeling server's own corresponding identifier that is linked to a rich set of data, such as the consumption history. In one embodiment, to access the consumption history, the advertising system 140 requests it from the data store 122 in step 203 and receives it from the data store 122 in step 204.

In step 205, an advertising targeting model is applied to determine the value of the bid opportunity based on a plurality of features. As discussed above, the features include information that is known or can be inferred from elements of the consumption history. Depending on the implementation of the model 150, the output of the model may be a score, a percentage likelihood, a binary result, or other indication of whether the bid opportunity is valuable to an advertising campaign. In some cases, the indication of value output by the model is then translated into a bid amount at the modeling server 270.

If the bid opportunity is judged valuable, in step 206, the modeling server 270 submits to the ad exchange 260 a bid amount and an ad redirect to send to the browser 110 should the bid win the auction. The ad redirect provides instructions for redirecting the browser to a server that will serve the ad for the advertising campaign that submitted the winning bid. The ad redirect with provide instructions for redirecting the browser to one of the stable creatives or to one of the trendy creatives in proportion to the frequency of stable keywords versus trendy keywords among the histories of the browsers in the group. For example, if in the most recent time period, trendy keywords made up a two-thirds proportion of the combined frequency of the top N keywords, and stable keywords made up a one-third proportion, then in the current period, the advertising system 140 will attempt to serve the trendy creative twice as often as the stable creative in order to mirror the audience's interest in new trends.

In step 207, the ad exchange 260 determines the auction winner from the submitted bids. In some implementations, the ad exchange 260 may send a notification to the winner and/or the other bidders. The notification may include an indication of whether the bidder won the auction, and may confirm the amount that the winner will be charged for buying the ad placement, which is some cases is the amount of the second highest bid. Because not every auction will be won by the advertising system 140, the advertising system 140 will also track delivery rates as reported by the ad exchange 260 from time to time, and make adjustments to the ad redirects 206 sent to the ad exchange 260 with new bids as needed to meet the desired proportions of stable creatives versus trendy creatives.

In step 208, the ad exchange 260 sends the ad redirect included with the winning bid to the browser 110. The browser 110 uses the ad redirect to access the ad so that the user can view the ad in step 209.

If the advertisement was successful, in step 210 the user converts. As discussed above, the definition of conversion may differ between campaigns, but generally involves the user taking some desirable and observable action within a particular time frame. Depending on the definition of conversion, the conversion event need not occur immediately after viewing the ad, and may be offset in time from viewing the ad (e.g., by minutes, hours, days, etc.) and still be counted as a conversion provided that it occurs within the provided time frame, referred to as a conversion window. In step 211, the signal of conversion can be directly or indirectly conveyed from the browser 110 to the modeling server 270. The signal of conversion may include details of the conversion activity, but importantly, the modeling server 270 can use the newly received converter data along with non-converter data received from data store 222 in step 212 to update the model for targeting advertisements in step 213.

In some implementations, the process illustrated in steps 201 through 213 of FIG. 2 can be executed in a few seconds. Ideally, the time passage between the browser 110 requesting the ad in step 201 and the user viewing the ad in step 209 is short enough not to impact the user's enjoyment of the publisher's website that the user is browsing. In other words, there is no noticeable lag to download and display the appropriate ad of the winning bidder in the auction. The time period between the user viewing the ad in step 209 and converting in step 210 may be variable, but steps 211 through 213 can be completed in rapid succession once the user converts. Thus, the model at the modeling server 270 is refreshed very quickly with the most recent data.

Figure 3:
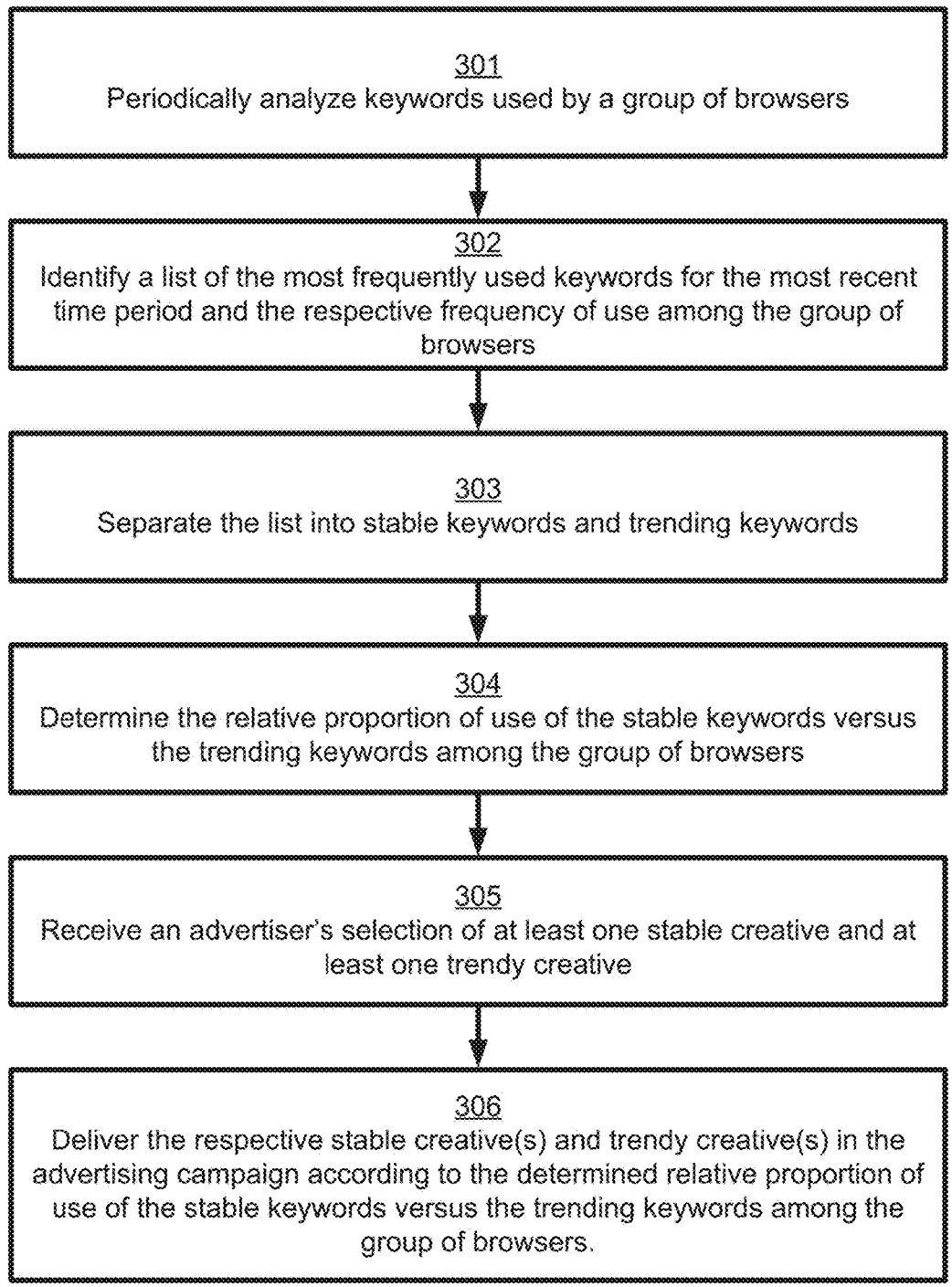
FIG. 3 is a flow chart illustrating a method of delivering creatives, in accordance with an embodiment of the invention.

FIG. 3 is a flow chart illustrating a method of delivering creatives, in accordance with an embodiment of the invention. In some implementations, the steps are performed in an order other than the order presented in FIG. 3, and in other implementations, additional or alternative steps may be performed.

In step 301, the keywords used by a group of browsers are periodically analyzed. As described above, they are analyzed by frequency of use among the browsers in the group. In one embodiment, they are sorted in order from the highest frequency to the lowest frequency. For example, the group of browsers corresponds to an advertiser's converter pool, the sorted list would reveal which keywords were most frequently found in the histories of the converters. If the group of browsers corresponds to the browsers that have searched for a particular keyword, such as a brand name, the sorted list would reveal which other keywords were most frequently found in the histories of the browsers that contained a search for that brand name. In the example illustrated in FIG. 4, the group of browsers that searched for "Las Vegas" were analyzed.

In step 302, a list of the most frequently used keywords for the most recent time period and the respective frequency of use among the group of browsers is identified. In one embodiment, this list may be displayed as a word cloud, with the size of the text of the word corresponding to the respective frequency of the word's use among the group of browsers. The list may be limited to 10, 20, 100, or any other size. In the example illustrated in FIG. 4, the list of the most frequently used keywords among the browsers that searched for "Las Vegas" include Show Tickets, Casinos, LAS, Convention Center, Spa Treatments, Hotel Buffets, Strip, March Madness, Yoga Retreat, and Yoga Pants. In the example illustrated in FIG. 5, the most frequently used keywords among the browsers that searched for "San Francisco" include Bay Area, Restaurants, Traffic, Giants, 49ers, Golden Gate, Weather, Fisherman's Warf, Traveling Exhibit, and City Hall Protest. In both of these examples, the list is limited to 10 keywords.

In step 303, the list of the most frequently used keywords among the group of browsers is separated into stable keywords and trending keywords. As described above, stable keywords have appeared in previous lists from previous time periods, such as the most recent 3 time periods. Therefore, it is expected that these keywords will continue to be among the highest frequency words in the next period or several periods as well. Trending keywords are keywords that have newly appeared on the list of the highest frequency words. For example, trending keywords are newly emerging in popularity among the histories of the group of browsers that are analyzed. Although such trending keywords may continue to be among the highest frequency words in the next period, it is expected that the popularity among the histories of the group of browsers that are analyzed will decrease again. In one embodiment, the stable keywords are visually distinguished from the trending keywords in a user interface presented to the advertiser. In the example illustrated in FIG. 4, the stable keywords are presented in bold font, namely Show Tickets, Casinos, LAS, Convention Center, Strip, Spa Treatments, and Hotel Buffets. The trending keywords in FIG. 4, namely Yoga Retreat, Yoga Pants, and March Madness are presented in italic font. This trends might occur, for example, if a lot of people were planning visits to Las Vegas for an annual Yoga convention, and if Las Vegas were hosting events in conjunction with the NCAA basketball tournament around the same time period. FIG. 5 illustrates the stable and the trending keywords presented on different sides of the user interface in two different word clouds.

In step 304, the relative proportion of use of the stable keywords versus the trending keywords among the group of browsers is determined. For example, the stable keywords may be used in a ratio of about 1:1 with trending keywords at some time periods, and at different times the stable keywords may dominate or the trending keywords may dominate. A spike in trending keywords indicates a target audience is seeking out new things and is likely to be more receptive to creatives designed to appeal to current trends. Thus, advertisers seeking to respond to these trends should serve a greater proportion of their trendy creatives as compared to their stable creatives. Conversely, a dip in trending keywords indicates a target audience is seeking out the standard, classic, expected things and is likely to be more receptive to creatives designed with classic, stable, tried and true themes. In one embodiment, the relative proportion of use of the stable keywords versus the trending keywords among a group of browsers is calculated by summing the instances of use of each of the stable keywords among the group of browsers and comparing it to a summation of the instances of use of the trending keywords among the group of browsers. The two sums can be related in a ratio or referred to as relative proportions of a whole, wherein the whole is the two sums added together. For example, if the seven words that are stable among the list of the most frequently used keywords were cumulatively used 4000 times among the group of browsers, and the three words that are trending were cumulatively used 1000 times among the same group of browsers, then the ratio of stable to trending is 4:1. The relative proportion of stable keyword usage is 4000/(4000+1000)=0.8 and the relative proportion of trending keyword usage is 1000/(4000+1000)=0.2.

In step 305, an advertiser's selection of at least one stable creative and at least one trendy creative is received. For example, if the City of Las Vegas was running an online advertising campaign with a goal of increasing tourism, they may select a classic image of the iconic Las Vegas Strip lit up in neon as their stable creative. The City of Las Vegas may select a collage image showcasing popular springtime events in the city as their trendy image. In some instances, more than one stable creative or more than one trendy creative may be received from the advertiser 130 with the intention that the advertising system 140 use them in rotation.

In step 306, the respective stable creative(s) and trendy creative(s) are delivered in the advertising campaign according to the determined relative proportion of use of the stable keywords versus the trending keywords among the group of browsers. In the example discussed above, the relative proportion of stable keyword usage is 0.8 and the relative proportion of trending keyword usage is 0.2, then the advertising system 140 will deliver the stable creative 80% of the time and the trendy creative 20% of the time. Thus, the stable creative will be delivered approximately 4 times for every 1 time that a trendy creative is delivered.

The above described technique can be especially useful for advertisers who are bidding on opportunities to show advertisements where little is known about the browser's history. Instead of tailoring the creative to something in an individual browser's history, a creative is chosen by playing the odds of what the target audience is interested in as revealed by the target audience's use of keywords. By extrapolating from what a group of browsers such as the advertiser's converters are searching, the advertiser can infuse their advertising campaigns with an amount of freshness that matches their audience's interest in fresh versus classic creatives.

Figure 4:
FIG. 4 is an example user interface for displaying keyword trends, in accordance with an embodiment of the invention.
Figure 4:
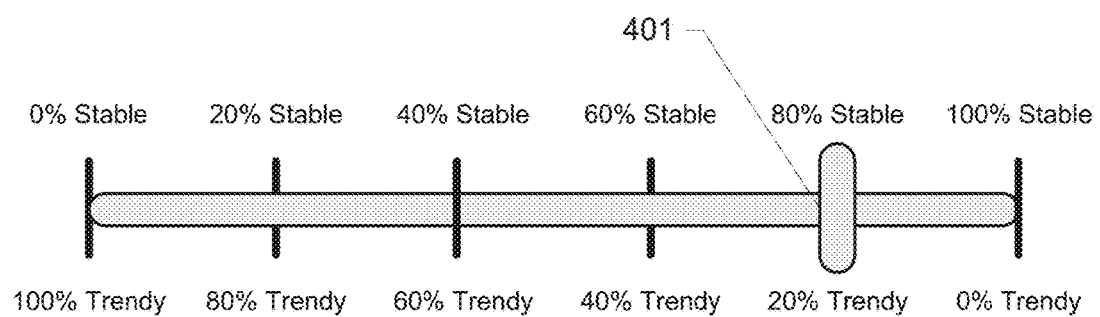

In an alternative embodiment, the advertiser 130 may provide input into the advertising system 140 regarding how responsive to keyword trends that the advertiser 130 wants the advertising system 140 to be. One example mechanism for providing input is a slider 401 illustrated in FIG. 4. The original position of the slider 401 indicates the proportion of stable versus trendy creatives recommended to use in the advertising campaign based on frequency of use of stable versus trendy keywords in a group of browsers. For example, FIG. 4 shows the slider 401 at a position to delivery 80% stable creatives and 20% trendy creatives in the campaign based upon the relative proportion of stable keyword usage being 0.8 and the relative proportion of trending keyword usage being 0.2. However, if the advertiser 130 wants to emphasize the stable creatives over the trendy creatives, the advertiser 130 can slide the slider 401 toward the right end of the scale, which directs the advertising system 140 to increase proportion of stable creatives delivered and decrease the proportion of trendy creatives delivered. Conversely, if the advertiser 130 wants to emphasize the trendy creatives over the stable creatives, the advertiser 130 can slide the slider 401 toward the left, which correspondingly shifts the proportions in favor of delivering trendy creatives over stable creatives. Using the slider 401 mechanism, the advertiser 130 can provide input to adjust the reactivity of the advertising campaign to the keyword trends. These modifications to the recommended proportions are received by the advertising system 140 and implemented by the creative selection module 191 of the advertising system 140 during the next period of the campaign's delivery.

Physical Components of a Computer

Figure 6:
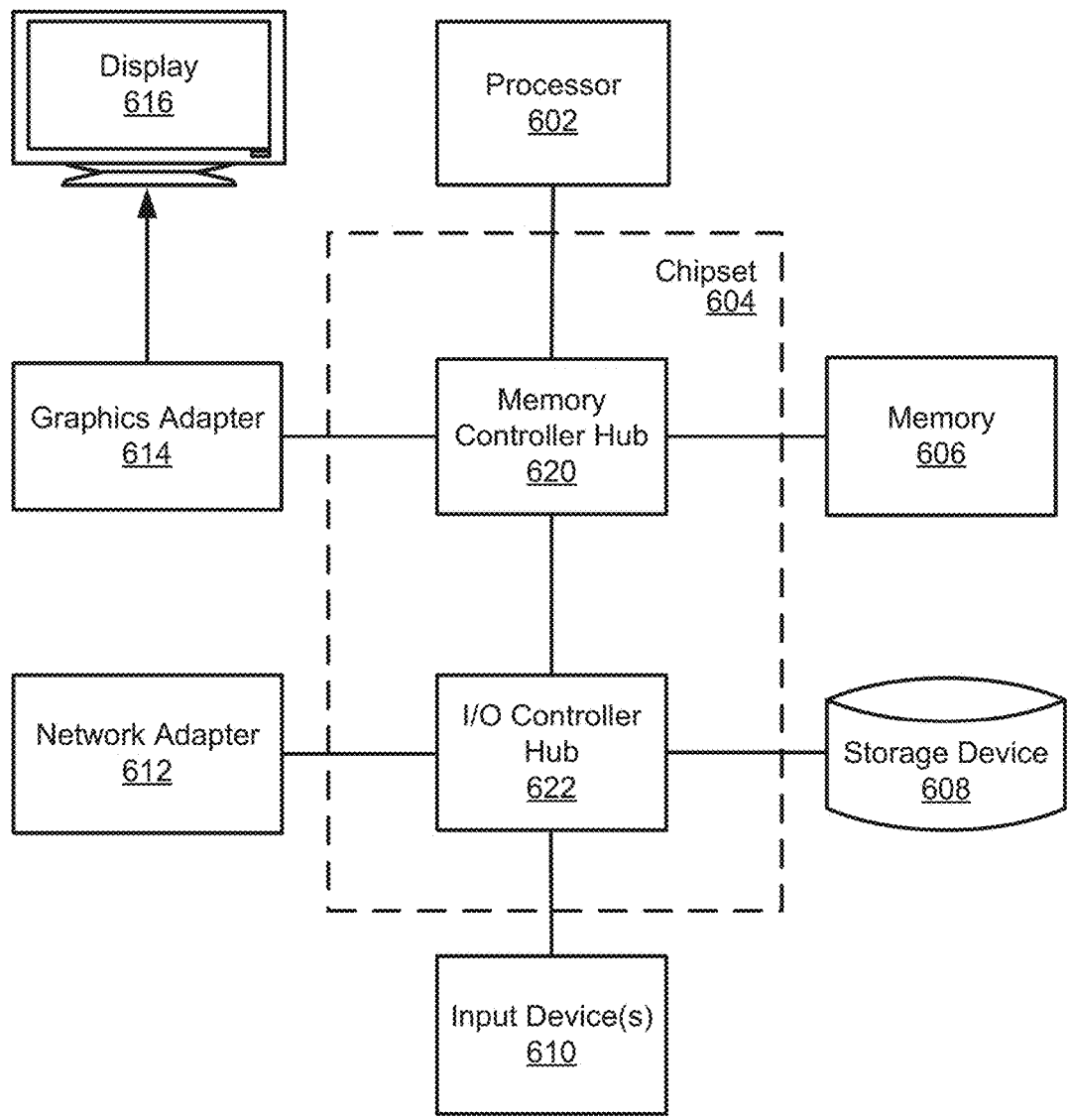
FIG. 6 is a high-level block diagram of the components of a computing system for use, for example, as advertising system 140 depicted in FIG. 1, in accordance with an embodiment of the invention.

FIG. 6 is a high-level block diagram of the components of a computing system 600 for use, for example, as an advertising system 140 depicted in FIG. 1, in accordance with an embodiment. Illustrated are at least one processor 602 coupled to a chipset 604. Also coupled to the chipset 604 are a memory 606, a storage device 608, input device(s) 610, a network adapter 612, and a graphics adapter 614. A display 616 is coupled to the graphics adapter 614. In one embodiment, the functionality of the chipset 604 is provided by a memory controller hub 620 and an I/O controller hub 622. In another embodiment, the memory 606 is coupled directly to the processor 602 instead of the chipset 604.

The processor 602 is the hardware logic circuitry of the computer 600 that processes instructions such as computer programs to operate on data. The memory 606 holds instructions and data used by the processor 602. The storage device 608 is any non-transitory computer-readable storage medium, such as a hard drive, compact disk read-only memory (CD-ROM), DVD, or a solid-state memory device. The input devices(s) 610 may be a keyboard, mouse, track ball, touch-sensitive screen and/or another type of pointing device to input data into the computer 600. The network adapter 612 couples the computer 400 to a network. The graphics adapter 614 displays images and other information on the display 616.

As is known in the art, a computer 600 can have different and/or other components than those shown in FIG. 6. In addition, the computer 600 can lack certain illustrated components. In one embodiment, a computer 600 acting as a server may lack an input device 610, a graphics adapter 614, and/or a display 616. Moreover, the storage device 608 can be local and/or remote from the computer 600 (such as embodied within a storage area network (SAN)).

As is known in the art, the computer 600 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602. The functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A method, comprising:
receiving, by an advertising system and from a consumption history server, consumption history data stored in a database wherein the consumption history data is data received from a plurality of user devices executing a group of browsers;
analyzing, by the advertising system, keywords present in the consumption history data of the group of browsers;
based on the analyzing:
identifying, by the advertising system, a list of keywords used during a recent time period and a respective frequency of use by the group of browsers;
identifying, by the advertising system, a stable keyword group comprising stable keywords from the list of keywords and a trending keyword group comprising trending keywords from the list of keywords; and
determining, by the advertising system, a keyword proportion, wherein the keyword proportion is a relative proportion of use of the keywords in the stable keyword group versus the keywords in the trending keyword group by the group of browsers;
receiving, by the advertising system, an advertiser's selection of a stable creative and a trendy creative; and
responsive to determining, by the advertising system, to respond to a first plurality of bid requests received from an ad exchange, delivering, by the advertising system to the ad exchange, a plurality of bid responses, each bid response corresponding to one of the plurality of bid requests and comprising one of the stable creative or the trendy creative, wherein the advertising system delivers the stable creative and the trendy creative with the bid responses according to the keyword proportion.

2. The method of claim 1, further comprising graphically displaying, by the advertising system, the stable keywords and the trending keywords to an advertiser, wherein the stable keywords are visually distinguished from the trending keywords in a user interface presented to the advertiser.

3. The method of claim 1, wherein the group of browsers comprises browsers that have visited a particular webpage.

4. The method of claim 1, wherein the group of browsers comprises browsers that searched for a particular keyword.

5. The method of claim 1, wherein the group of browsers comprises a set of converters.

6. The method of claim 1, further comprising notifying, by the advertising system, the advertiser of newly trending keywords.

7. The method of claim 1, further comprising receiving, by the advertising system, a modification to the keyword proportion and delivering the stable creative and the trendy creative according to the modified keyword proportion.

8. A non-transitory computer-readable storage medium storing processor-executable computer program instructions for that, when executed, cause a computer processor to perform a method, the method comprising:
receiving, by an advertising system and from a consumption history server, consumption history data stored in a database wherein the consumption history data is received from a plurality of user devices executing a group of browsers;
analyzing, by the advertising system, keywords present in the consumption history data of the group of browsers;
based on the analyzing:
identifying, by the advertising system, a list of keywords used during a recent time period and a respective frequency of use by the group of browsers;
identifying, by the advertising system, a stable keyword group comprising stable keywords from the list of keywords or a trending keyword group comprising trending keywords from the list of keywords; and
determining, by the advertising system, a keyword proportion, wherein the keyword proportion is a relative proportion of use of the keywords in the stable keyword group versus the keywords in the trending keyword group by the group of browsers;
receiving, by the advertising system, an advertiser's selection of a stable creative and a trendy creative; and
responsive to determining, by the advertising system, to respond to a plurality of bid requests received from an ad exchange, delivering, by the advertising system to the ad exchange, a plurality of bid responses, each bid response corresponding to one of the plurality of bid requests and comprising the stable creative or the trendy creative, wherein the advertising system delivers the stable creative and the trendy creative with the bid responses according to the keyword proportion.

9. The non-transitory computer-readable storage medium of claim 8, wherein the medium further comprises instructions for graphically displaying, by the advertising system, the stable keywords and the trending keywords to an advertiser, wherein the stable keywords are visually distinguished from the trending keywords in a user interface presented to the advertiser.

10. The non-transitory computer-readable storage medium of claim 8, wherein the group of browsers comprises browsers that have visited a particular webpage.

11. The non-transitory computer-readable storage medium of claim 8, wherein the group of browsers comprises browsers that searched for a particular keyword.

12. The non-transitory computer-readable storage medium of claim 8, wherein the group of browsers comprises a set of converters.

13. The non-transitory computer-readable storage medium of claim 8, wherein the medium further comprises instructions for notifying, by the advertising system, the advertiser of newly trending keywords.

14. The non-transitory computer-readable storage medium of claim 8, wherein the medium further comprises instructions for receiving, from the advertising system, a modification to the keyword proportion and delivering the stable creative and the trendy creative according to the modified keyword proportion.

15. A system comprising:
a processor;
a non-transitory computer-readable storage medium storing processor-executable computer program instructions that, when executed, cause a computer processor to perform a method, the method comprising:
receiving, by an advertising system and from a consumption history server, consumption history data stored in a database wherein the consumption history data is received from a plurality of user devices executing a group of browsers;
analyzing, by the advertising system, keywords present in the consumption history data of the group of browsers;

based on the analyzing:
- identifying, by the advertising system, a list of keywords used during a recent time period and a respective frequency of use by the group of browsers;
- identifying, by the advertising system, a stable keyword group comprising stable keywords from the list of keywords and a trending keyword group comprising trending keywords from the list of keywords; and
- determining, by the advertising system, a keyword proportion, wherein the keyword proportion is a relative proportion of use of the keywords in the stable keyword group versus the keywords in the trending keyword group by the group of browsers;

receiving, by the advertising system, an advertiser's selection of a stable creative and a trendy creative; and responsive to determining, by the advertising system, to respond to a plurality of bid requests received from an ad exchange, delivering, by the advertising system to the ad exchange, a plurality of bid responses, each bid response corresponding to one of the plurality of bid requests or comprising the stable creative or the trendy creative, wherein the advertising system delivers the stable creative and the trendy creative with the bid responses according to the keyword proportion.

16. The system of claim 15, wherein the non-transitory computer-readable storage medium further comprises instructions for graphically displaying, by the advertising system, the stable keywords and the trending keywords to an advertiser, wherein the stable keywords are visually distinguished from the trending keywords in a user interface presented to the advertiser.

17. The system of claim 15, wherein the group of browsers comprises browsers that have visited a particular webpage.

18. The system of claim 15, wherein the group of browsers comprises browsers that searched for a particular keyword.

19. The system of claim 15, wherein the group of browsers comprises a set of converters.

20. The system of claim 15, wherein the non-transitory computer-readable storage medium further comprises instructions for receiving, by the advertising system, a modification to the keyword proportion and delivering the stable creative and the trendy creative according to the modified keyword proportion.

21. The method of claim 1, wherein the identifying, by the advertising system, a stable keyword group and a trending keyword group further comprises:
- identifying, by the advertising system, a current frequently used keyword list corresponding to the recent time period and a previous frequently used keyword list corresponding to a previous time period;
- wherein the stable keywords comprise keywords which are on the current frequently used keyword list and are on the previous frequently used keyword list, and the trending keywords comprise keywords which are on the current frequently used keyword list and are not on the previous frequently used keyword list.

22. The non-transitory computer-readable storage medium of claim 8, wherein the identifying, by the advertising system, a stable keyword group and a trending keyword group further comprises:
- identifying, by the advertising system, a current frequently used keyword list corresponding to the recent time period and a previous frequently used keyword list corresponding to a previous time period;
- wherein the stable keywords comprise keywords which are on the current frequently used keyword list and are on the previous frequently used keyword list, and the trending keywords comprise keywords which are on the current frequently used keyword list and are not on the previous frequently used keyword list.

23. The system of claim 15, wherein the identifying, by the advertising system, a stable keyword group and a trending keyword group further comprises:
- identifying, by the advertising system, a current frequently used keyword list corresponding to the recent time period and a previous frequently used keyword list corresponding to a previous time period;
- wherein the stable keywords comprise keywords which are on the current frequently used keyword list and are on the previous frequently used keyword list, and the trending keywords comprise keywords which are on the current frequently used keyword list and are not on the previous frequently used keyword list.

* * * * *